Patented Oct. 31, 1922.

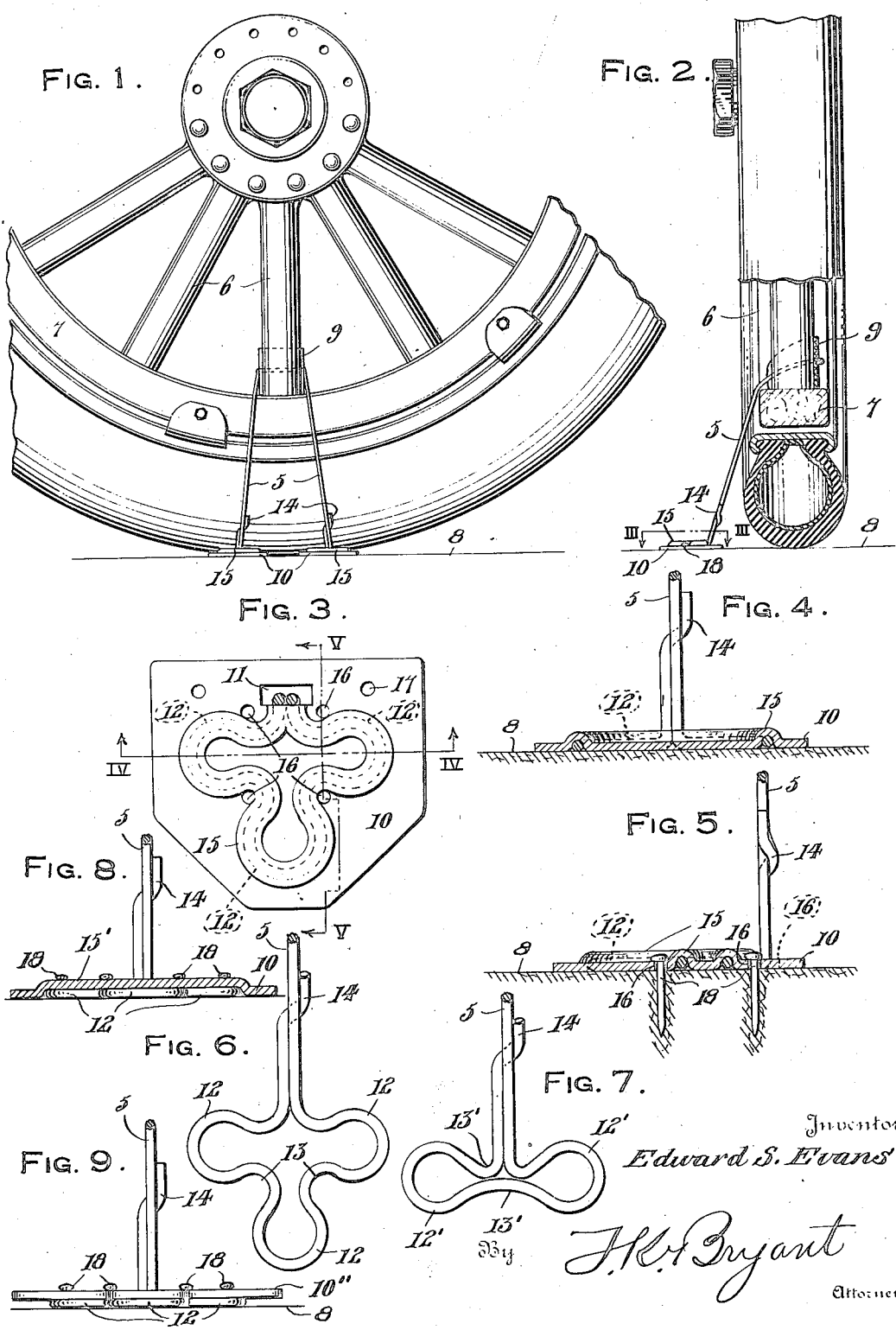

1,434,333

UNITED STATES PATENT OFFICE.

EDWARD S. EVANS, OF DETROIT, MICHIGAN.

AUTOMOBILE TIE-DOWN DEVICE.

Application filed September 15, 1921. Serial No. 500,828.

*To all whom it may concern:*

Be it known that I, EDWARD S. EVANS, a citizen of the United States of America, residing at Detroit, in the county of Wayne and State of Michigan, have invented certain new and useful Improvements in Automobile Tie-Down Devices, of which the following is a specification.

This invention relates to certain new and useful improvements in devices for tying down automobiles to the floor of a freight car during shipment and has particular reference to the provision of re-usable tie down devices of the above kind adapted to be employed with the wheels of the automobile withuot requiring special skill for placing the same into practical use.

The primary object of the present invention is to provide a wheel tie down device of the above character which may be cheaply manufactured by reason of its simplicity of construction and which will efficiently serve the purpose for which it is intended.

Briefly described, the invention preferably consists of a flexible member or wire adapted to be passed around a spoke of the wheel with its ends both passing to the outside of the felly and passing through slots in securing plates with the extreme end portions of said flexible member, beneath the plate, formed upon compound curves in such manner that when nails are driven through the plate at the reentrant portions of the wire ends, said ends are effectively held against being drawn through the plates, thus effectively tying down the automobile.

With the above general objects in view and others that will become apparent as the nature of the invention is better understood, the same consists in the novel form, combination and arrangement of parts hereinafter more fully described, shown in the accompanying drawings and claimed.

In the drawings forming a part of this application, and in which like characters of reference indicate corresponding parts throughout the several views, Figure 1 is a fragmentary elevational view of an automobile wheel equipped with a tie down device constructed in accordance with the present invention, Figure 2 is a view partly in edge elevation and partly in transverse section of an automobile wheel and tie down device shown in Figure 1,

Figure 3 is an enlarged sectional view taken on line III—III of Figure 2,

Figure 4 is a sectional view taken upon line IV—IV of Figure 3,

Figure 5 is a sectional view taken upon line V—V of Figure 3,

Figure 6 is an enlarged detail view showing the formation of the ends of the flexible member or wire, employed in the form of the invention shown in Figures 1 to 5 inclusive, Figure 7 is a view similar to Figure 6 of a modified form of the wire ends, Figure 8 is a view similar to Figure 4 showing a modified form of the securing plate, and Figure 9 is a fragmentary elevational view showing a still further modified form of the securing plate and the adjacent end of the flexible member.

Referring more in detail to the several views, the present invention is adapted for tying down an automobile to a car floor during shipment and as shown in Figures 1 to 5 inclusive consists of a flexible tie member or wire 5 of general U-shape with its intermediate portion directed laterally and passing around the lowermost spoke 6 of the automobile wheel and with its ends extending outwardly over the same side of the felly 7 of said wheel and downwardly to a point adjacent the floor of the car which is diagrammatically indicated by the line 8, a suitable protecting sheet 9 being interposed between the spoke and the central portion of the wire member 5 for preventing chafing of said spoke. Each end of the wire member 5 is nailed to the floor through a sheet metal stamping 10 which may be of various forms and which has a slot 11 through which the end of the wire member passes. In the form of the securing plate or sheet metal stamping 10 and of the wire ends as shown in Figures 1 to 6, the said wire ends are formed or return-bent upon compound curves and somewhat cloverleaf forms as more clearly shown in Figure 6 with a plurality of outwardly curved portions 12 connected by reentrant portions 13, with the extreme free end of the wire twisted above the body portion of the same as at 14 above the securing plate. The securing plate 10 is offset to provide a raised portion 15 to receive the looped end or foot of the wire so that said clamping plate may be brought into contact with the floor with the looped end portion of the wire between the floor and the clamping plate when the latter is nailed to said floor by means of nails passing through openings 16 provided in the clamping plate at the reentrant portions 13. By forming the ends of the wire member 5 and the clamping plate 10 in this manner, the ends of the wire are effectively secured to the floor of the car and with little or no liability of the wire ends pulling loose or pulling through the slot 11. If additional securing means is necessary, the same may be driven through additional holes 17 provided in the clamping plate.

Obviously, as shown in Figure 7, the ends of the wire member 5 may be slightly changed in form so as to embody only two loop portions 12′ so that the same will have the general form of the numeral 8 while providing the reentrant portions 13′ with the clamping plate similarly formed with the same shape of bead or upwardly depressed portion.

As shown in Figure 8, instead of offset or depressing a portion of the securing plate 10′ to provide a bead in which the looped end of the wire member seats, the entire central portion of the securing plate may be depressed upwardly as at 15′ in the general form of the looped end of the wire so that merely the margins of the clamping plate will engage the floor. Otherwise, the form of the invention shown in Figure 8 is similar to that of Figure 3.

In the tying down of comparatively light automobiles or in the shipment of automobiles for a short distance, the clamping plate may be simply formed flat as at 10″ in Figure 9 with the wire passing through a slot in the clamping plate as in Figure 3 and the looped portion of each end of the wire disposed underneath said plate as shown and with the nails 18 passing through the plate 10″ at the reentrant portions of the looped ends of the wire member as above described with respect to Figures 1 to 5 inclusive. This will provide a more simple and cheap construction which will be found effective in certain cases.

In the operation, one tie down device is preferably employed with each wheel of the automobile, and when the wire member is passed around the spoke as shown clearly in Figures 1 and 2, nails are driven through the holes in the clamping plate or sheet metal stamping and into the floor of the car so that the ends of the wire member are effectively anchored and the automobile thereby held to the floor in a manner to withstand ordinary jerks and jars incident to shipment in railway rolling stock.

From the foregoing description, it is believed that the construction and operation as well as the advantages of the present invention will be readily understood and appreciated by those skilled in the art.

Minor changes may be made without departing from the spirit and scope of the invention as claimed.

What is claimed as new is:

1. An automobile wheel-engaging tie down device including a flexible member adapted to be passed around a spoke of the wheel with the end portions of the same extending outwardly over the same side of the wheel felly and downwardly adjacent the floor of a car or the like, the end portions of said flexible member being formed upon compound curves into loops having outwardly curved portions connected by reentrant portions, and a clamping plate for each looped end of the flexible member and having a slot through which said flexible member extends, said looped ends of the flexible member being disposed beneath said clamping plate, said clamping plate being provided with openings for the reception of securing devices at the reentrant portions of the looped ends of the flexible member, said clamping plate being offset in the general form of the looped ends of the flexible member whereby said looped ends may be seated in the offset portions of the clamping plates to permit the margin of the clamping plate to substantially contact the floor of the car.

2. In a tie down device for automobile wheels, a flexible member shaped to fit around a spoke of a wheel and to extend from said spoke over the same side of the wheel felly and then downwardly where its free end portions are directed outwardly at an angle to flatly contact the floor, and a clamping plate disposed upon each free end portion of the flexible member and having offset portions in which the end portions of said flexible member seat to permit the remaining portions of the clamping plate to substantially contact the floor, said clamping plate being adapted to be secured to said floor.

3. In a tie down device for automobile wheels, a flexible member shaped to fit around a spoke of a wheel and to extend from said spoke over the same side of the wheel felly and then downwardly where its free end portions are directed outwardly at an angle to flatly contact the floor, and a clamping plate disposed upon each free end portion of the flexible member and having offset portions in which the end portions of said flexible member seat to permit the remaining portions of the clamping plate to substantially contact the floor, said clamping plate being adapted to be secured to said floor, the clamping plate being provided with slots communicating with the offset portions thereof and the flexible member passing through said slots.

4. A wheel anchoring device comprising a tie member engageable at its upper end with a vehicle wheel and having its lower end bent to form a foot, and a securing plate engaging the foot portion of said tie member, said securing plate being offset for reception of said foot portion.

5. A wheel anchoring device comprising a tie member engageable at its upper end with a vehicle wheel, and having an open loop at its lower end bent to form a securing foot, and a securing plate engaging the foot portion of said tie member, said securing plate being offset for reception of said foot portion.

6. A wheel anchoring device comprising a tie member engageable at its upper end with a vehicle wheel, and bent at its lower end to form a foot, and a securing plate retained upon said tie member by said foot, said securing plate being offset to provide a seat for said foot.

7. An anchoring device comprising a slotted securing plate and a tie member provided at its lower end with a return bent portion adapted to engage the slotted portion in said securing plate, said securing plate being offset to form a seat for the return bent portion of the tie member.

8. An anchoring device comprising a securing plate, and a tie member provided with a foot having a return-bend for engaging the plate to retain the same, said plate being offset for reception of said foot.

9. An anchoring device comprising an apertured securing plate, a tie member having a foot with a return-bent portion engaging the plate and arranged to prevent disengagement from the plate, said plate being offset for reception of said foot.

In testimony whereof I affix my signature.

EDWARD S. EVANS.